United States Patent
Gattei

(10) Patent No.: US 11,466,868 B2
(45) Date of Patent: Oct. 11, 2022

(54) OVEN FOR BAKING FOOD PRODUCTS

(71) Applicant: Electrolux Home Products Corporation N. V., Brussels (BE)

(72) Inventor: Lorenzo Gattei, Forli (IT)

(73) Assignee: Electrolux Home Products Corporation N. V., Brussels (BE)

(*) Notice: Subject to any disclaimer, the term of this patent is extended or adjusted under 35 U.S.C. 154(b) by 185 days.

(21) Appl. No.: 16/434,315

(22) Filed: Jun. 7, 2019

(65) Prior Publication Data

US 2019/0285285 A1  Sep. 19, 2019

Related U.S. Application Data

(63) Continuation of application No. 14/375,666, filed as application No. PCT/EP2013/054958 on Mar. 12, 2013, now Pat. No. 10,344,988.

(30) Foreign Application Priority Data

Apr. 11, 2012  (EP) ..................................... 12163668

(51) Int. Cl.
  *F24C 15/32*  (2006.01)
  *F22B 1/28*  (2006.01)
  (Continued)

(52) U.S. Cl.
  CPC ............. *F24C 15/327* (2013.01); *A47J 27/04* (2013.01); *F22B 1/284* (2013.01); *F24C 15/003* (2013.01); *F24C 15/325* (2013.01)

(58) Field of Classification Search
  CPC .... F24C 15/003; F24C 15/325; F24C 15/327; A47J 27/04; A47J 27/043; F22B 1/284
  See application file for complete search history.

(56) References Cited

U.S. PATENT DOCUMENTS 3,915,124 A * 10/1975 Kuhn, Jr. ................ F28D 7/106
                                                                    122/115
4,031,911 A    6/1977 Frazar
(Continued)

FOREIGN PATENT DOCUMENTS

DE    102007048567    4/2009
FR         2614976    11/1988
(Continued)

OTHER PUBLICATIONS

Machine translation of FR2678359 (Year: 1991).*
International Search Report for PCT/EP2013/054958, dated Jun. 27, 2013, 2 pages.

*Primary Examiner* — Erin E McGrath
(74) *Attorney, Agent, or Firm* — Pearne & Gordon LLP

(57) ABSTRACT

The present invention relates to a steam system for a steam cooking appliance. The steam system includes a steam generator and a precipitator. The precipitator is arranged above the steam generator. The steam generator comprises two vertical heating pipe sections. Upper ends of the heating pipe sections are connected to a bottom side of the precipitator. Lower ends of the heating pipe sections are connected by a transverse pipe section. At least the heating pipe sections are at least partially enclosed by one of more heating elements. An inlet pipe is connected to the transverse pipe section at one end and connected or connectable to a water reservoir or water pump at another end. A return pipe is interconnected between the bottom side of the precipitator and the transverse pipe section. Further, the present invention relates to a corresponding steam cooking appliance.

18 Claims, 4 Drawing Sheets

(51) Int. Cl.
*A47J 27/04* (2006.01)
*F24C 15/00* (2006.01)

(56) References Cited

U.S. PATENT DOCUMENTS

| | | | |
|---|---|---|---|
| 4,506,598 A * | 3/1985 | Meister | F24C 15/327 |
| | | | 126/20 |
| 5,370,758 A | 12/1994 | Bourjala et al. | |
| 6,395,215 B1 | 5/2002 | Distelhoff et al. | |
| 2005/0087528 A1 | 4/2005 | Kanzaki et al. | |
| 2006/0249136 A1 | 11/2006 | Reay | |
| 2006/0249137 A1 * | 11/2006 | Reay | A47J 36/38 |
| | | | 126/20 |
| 2007/0062927 A1 | 3/2007 | Sells | |
| 2013/0133638 A1 * | 5/2013 | Kulakowski | B01D 17/0208 |
| | | | 126/19 R |

FOREIGN PATENT DOCUMENTS

| | | | |
|---|---|---|---|
| FR | 2678359 | 12/1992 | |
| FR | 2678359 A1 * | 12/1992 | F22B 1/284 |

* cited by examiner

OVEN FOR BAKING FOOD PRODUCTS

CROSS REFERENCE TO RELATED US APPLICATIONS

This application is a continuation of U.S. application Ser. No. 14/375,666 filed Jul. 30, 2014, which is the US national phase of PCT/EP2013/054958 filed Mar. 12, 2013, the contents of all of which are incorporated herein by reference.

DESCRIPTION

The present invention refers to an oven for baking food products.

In particular, the present invention is relative to an oven of the type comprising a baking chamber provided with a door for the introduction of the food products to be baked; a support frame, which extends around the baking chamber, and is thermally insulated from the baking chamber itself; a heating device, which is arranged inside the baking chamber, so as to provide the heat needed to bake the food products; and a feeding device for feeding steam into the baking chamber itself.

Generally, a feeding device of known type comprises a water tank, which is fitted to the support frame, a tank filling duct, to which the user has access from a front wall of the oven, a discharge duct for discharging the water contained in the tank outside of the oven, a steam generator, which communicates with the tank, and a feeding circuit for feeding the steam produced by the steam generator into the baking chamber.

In order to prevent water from being fed into the feeding circuit and, thus, into the baking chamber, the feeding device comprises, furthermore, a separation chamber, which is separate from the tank, is arranged between the steam generator and the feeding circuit, and is suitable to separate the water from the steam and to recirculate the water again to the inlet of the steam generator.

The tank normally comprises a cup-shaped container, and a closing lid, which is mounted on the cup-shaped container in a removable manner and is coupled in a fluid-tight manner to the cup-shaped container itself by means of the interposition of a plurality of gaskets.

The feeding device presents, furthermore, a filter, which is normally mounted inside the tank, so as to filter the water fed to the aforementioned discharge duct, and a level sensor for controlling the water level inside the tank itself.

The known ovens for baking food products of the type described above present some drawbacks, which are mainly caused by the fact that the tank is relatively complex and expensive to be produced due to the presence of the cup-shaped container, of the closing lid, and of the gaskets, i.e. of a relatively high number of components.

Furthermore, the assembling of the cup-shaped container, of the closing lid, and of the gaskets has to be performed along the assembly line of the oven and leads, therefore, to a relatively long assembling cycle and to the possibility of assembling mistakes.

The drawbacks described above are further increased by the fact that the aforementioned separation chamber is distinct and separate from the tank and has to be connected to the tank itself by means of the interposition of a feeding duct.

It is an object of the present invention to provide an oven for baking food products designed to eliminate the aforementioned drawbacks in a straightforward, relatively low-cost manner.

According to the present invention, there is provided an oven for baking food products as claimed in any of the following claims.

The present invention will now be described with reference to the accompanying drawings, which show a non-limiting embodiment, wherein.

Figure 1:
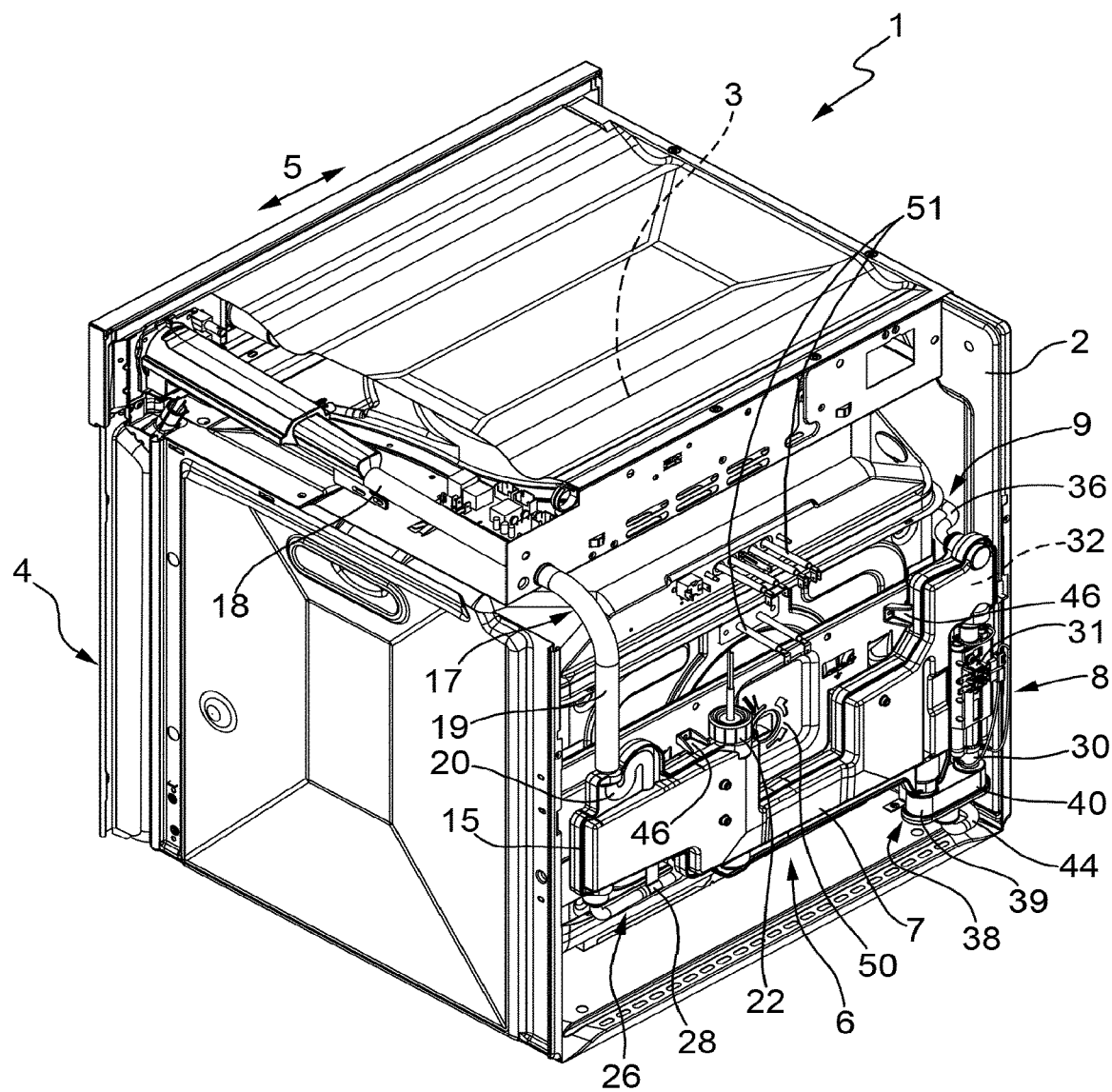
FIG. 1 shows a first schematic rear view in perspective of a preferred embodiment of the oven according to the present invention.
Figure 2:
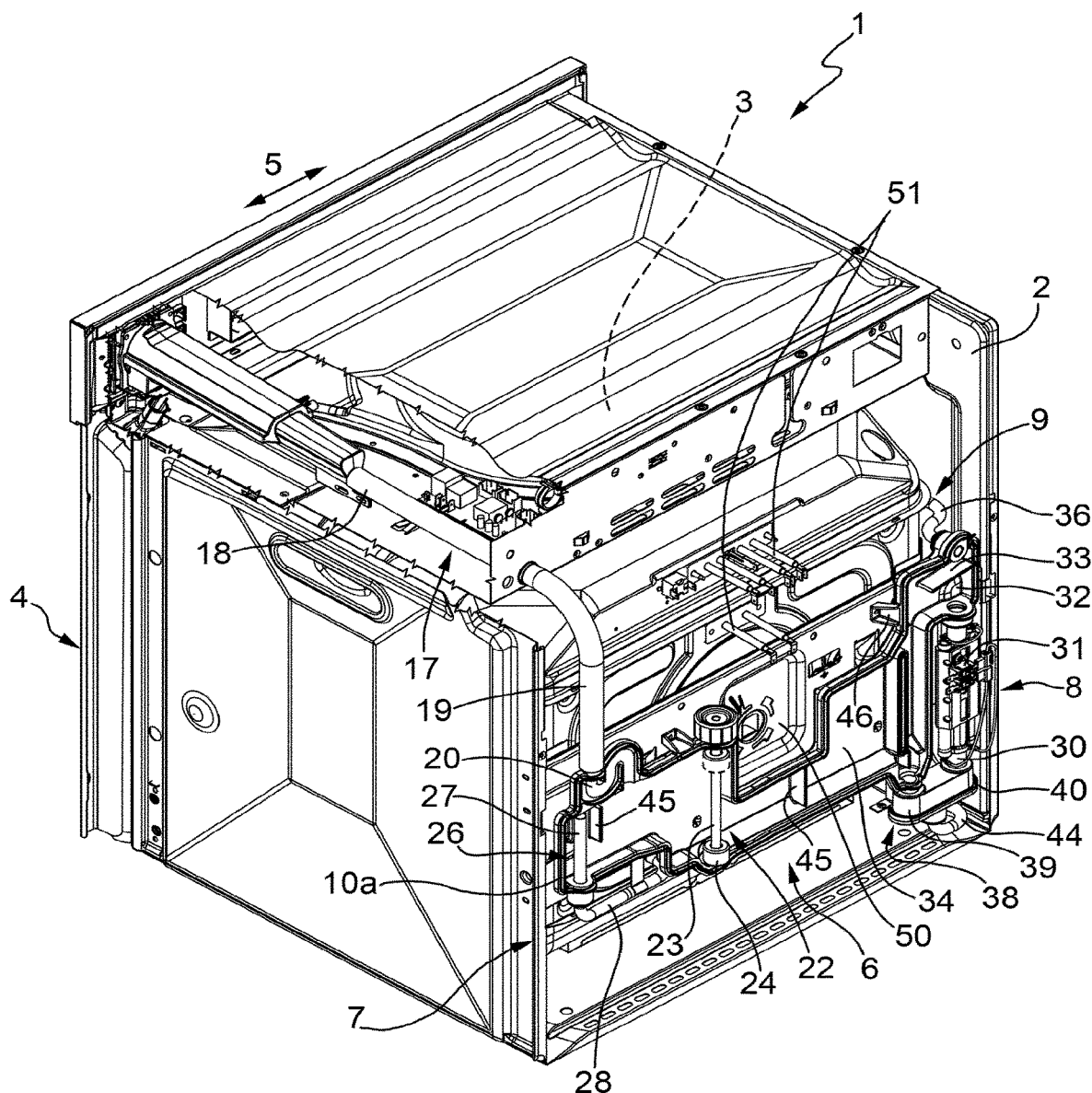
FIG. 2 shows a second schematic rear view in perspective, with parts removed for clarity, of the oven of FIG. 1.

Number 1 in FIGS. 1 and 2 indicates as a whole an oven for baking food products comprising a support frame 2 and a baking chamber 3, which is housed inside the frame 2 and is thermally insulated from the frame 2 itself by means of the interposition of a known insulating material, which is not shown.

The chamber 3 presents an opening (not shown), which allows the food products to be introduced inside the chamber 3, it is formed in correspondence to a front wall 4 of the oven 1, it extends in a substantially vertical containing plane, and is closed by a door (not shown), which is hinged to the frame 2 so as to rotate, with respect to the frame 2 itself, around a fulcrum axis (not shown), which may be parallel or perpendicular to a substantially horizontal direction 5.

The oven 1 is provided, furthermore, with a heating device 51, which is arranged inside the chamber 3, so as to provide the heat needed to bake the food products present inside the chamber 3 itself.

The oven 1 comprises, furthermore, a feeding unit 6, which is suited to feed steam into the chamber 3, and comprises, in turn, a tank 7 for containing water, a steam generator 8 communicating with the tank 7, and a feeding circuit 9 for feeding the steam produced by the generator 8 itself into the chamber 3.

Figure 4:
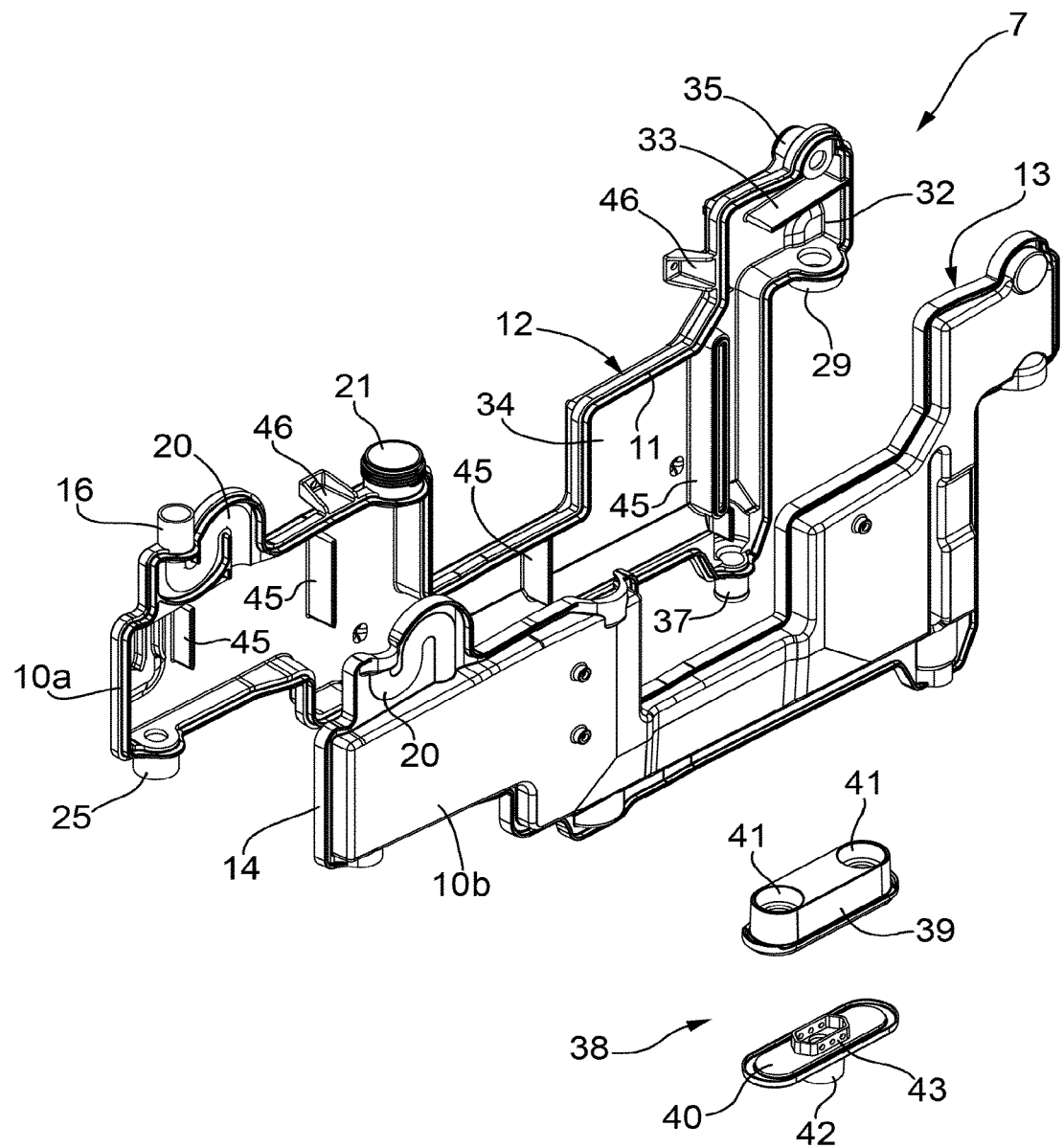
FIG. 4 shows an exploded view in perspective of a second detail of the oven of FIGS. 1 and 2.

As shown in FIG. 4, the tank 7 comprises two shells 10, each of which preferably presents a substantially U-shaped form, is cup-shaped, presents a concavity facing the other shell 10, and is made of a polymeric material, in particular an injection-moulded polymeric material. The U-shaped form of each shells 10 allows the tank 7 to be mounted on a back wall of an oven surrounding a motor device (not shown in the figures) arranged on a seat 50 formed on said back wall.

One of the shells 10 (hereinafter referred to as 10a) preferably presents a coupling rib 11, which extends along a peripheral edge 12 of the shell 10a, presents an annular shape, and, when the shells are coupled, it is housed inside an annular coupling seat 13, which is obtained along a peripheral edge 14 of the other shell (hereinafter referred to as 10b).

After the rib 11 has been inserted into the seat 13, the two shells 10a, 10b are coupled to each other along a junction line 15 (FIG. 1), which extends in a containing plane that is substantially parallel to the opening (not shown) of the chamber 3. The shells 10a, 10b are permanently connected to each other along the line 15 without the interposition of gaskets, in particular by means of welding, preferably but not necessarily by means of vibration welding.

With reference to FIGS. 1, 2, and 4, the tank presents a first sleeve 16, which is manufactured as one single piece together with the shell 10a, is preferably obtained substantially in correspondence to one lateral end of an upper section of the edge 12, projects upwards from the shell 10a, and is connected to a filling duct 17 for filling the tank 7 itself.

The duct 17 extends between the wall 4 and the sleeve 16, and comprises an inlet section 18 inclined downwards and a substantially vertical outlet section 19, which are suited to allow the tank 7 to be filled with water by gravity.

The tank 7 is provided, furthermore, with an air trap 20, which is manufactured partly on the shell 10a and partly on the shell 10b, and is obtained at the inlet of the sleeve 16, so as to prevent the steam from flowing along the duct 17 and from leaving the oven 1 through the wall 4.

The tank 7 presents, furthermore, a second sleeve 21, which is manufactured as one single piece together with the shell 10a, is preferably obtained in correspondence to an intermediate point of the upper section of the edge 12, projects upwards from the shell 10a, and is threaded on the outside, so as to allow the screwing of a level sensor 22.

The sensor 22 comprises a support rod 23 projecting inside the tank 7, and a float 24, which is coupled to the rod 23 in a sliding manner, so as to move between a lowered position corresponding to the minimum water level in the tank 7 and a raised position corresponding to the maximum water level in the tank 7 itself. The position of the float 23 along the rod 23 can be sensed by a sensing device, known per se, that outputs a signal to a display device indicating intelligibly to a user, in one case, the emptying of the tank 7 and, in the other case, the complete filling of the tank 7 itself.

The tank 7 is provided, furthermore, with a third sleeve 25, which is manufactured as one single piece together with the shell 10a, is preferably obtained in correspondence to a lateral end of a lower section of the edge 12, projects downwards from the shell 10a, and allows an overflow duct 26 to be connected to the tank 7.

The duct 26 comprises an inlet section 27, which is substantially vertical and projects inside the tank 7, and an outlet section 28, which communicates with the chamber 3, and is inclined downwards, so as to discharge into the chamber 3, by gravity, the excess water introduced by a user into the tank 7.

The tank 7 presents, furthermore, a fourth sleeve 29, which is manufactured as one single piece together with the shell 10a, is preferably obtained in correspondence to a lateral end of the lower section of the edge 12 opposite to the sleeve 25, projects downwards from the shell 10a, and allows the tank 7 to be connected to the upper end of a substantially vertical duct 30, which defines part of the steam generator 8, and is associated to a heating device 31, which is mounted on the duct 30 itself.

Due to the water evaporation in the duct 30, the generator 8 feeds through the sleeve 29 a mixture, which consists partly of steam and partly of water, and is caused to move forward into a separation chamber 32, which is shaped so as to allow the separation of water from the steam.

The chamber 32 is preferably obtained in correspondence to an upper lateral portion of the tank 7, extends both above the level defined by the inlet of the overflow duct 26 and above the level defined by the raised position of the float 24, and is limited on the upper side by a substantially horizontal inner deflector 33, which is manufactured as one single piece together with the shell 10a, and projects inside the tank 7 perpendicular to a bottom wall 34 of the shell 10a, so as to deviate downwards and into the tank 7 the water fed through the sleeve 29.

The chamber 32 communicates with the feeding circuit 9 by means of a fifth sleeve 35, which is manufactured as one single piece together with the shell 10a, is preferably obtained in correspondence to a lateral end of the upper section of the edge 12 opposite to the sleeve 16, projects horizontally from the wall 34 along a direction which is perpendicular to the horizontal direction 5 and to the opening provided for introducing food products inside the chamber 3. Said fifth sleeve 35 allows the tank 7 to be connected to a feeding duct 36, which defines part of the feeding circuit 9, and feeds the steam to at least one delivery nozzle (not shown), which is mounted inside the chamber 3.

The tank 7 presents, furthermore, a sixth sleeve 37, which is manufactured as one single piece together with the shell 10a, is preferably obtained in correspondence to an intermediate point of the lower section of the edge 12, and projects downwards from the shell 10a itself.

Figure 3:
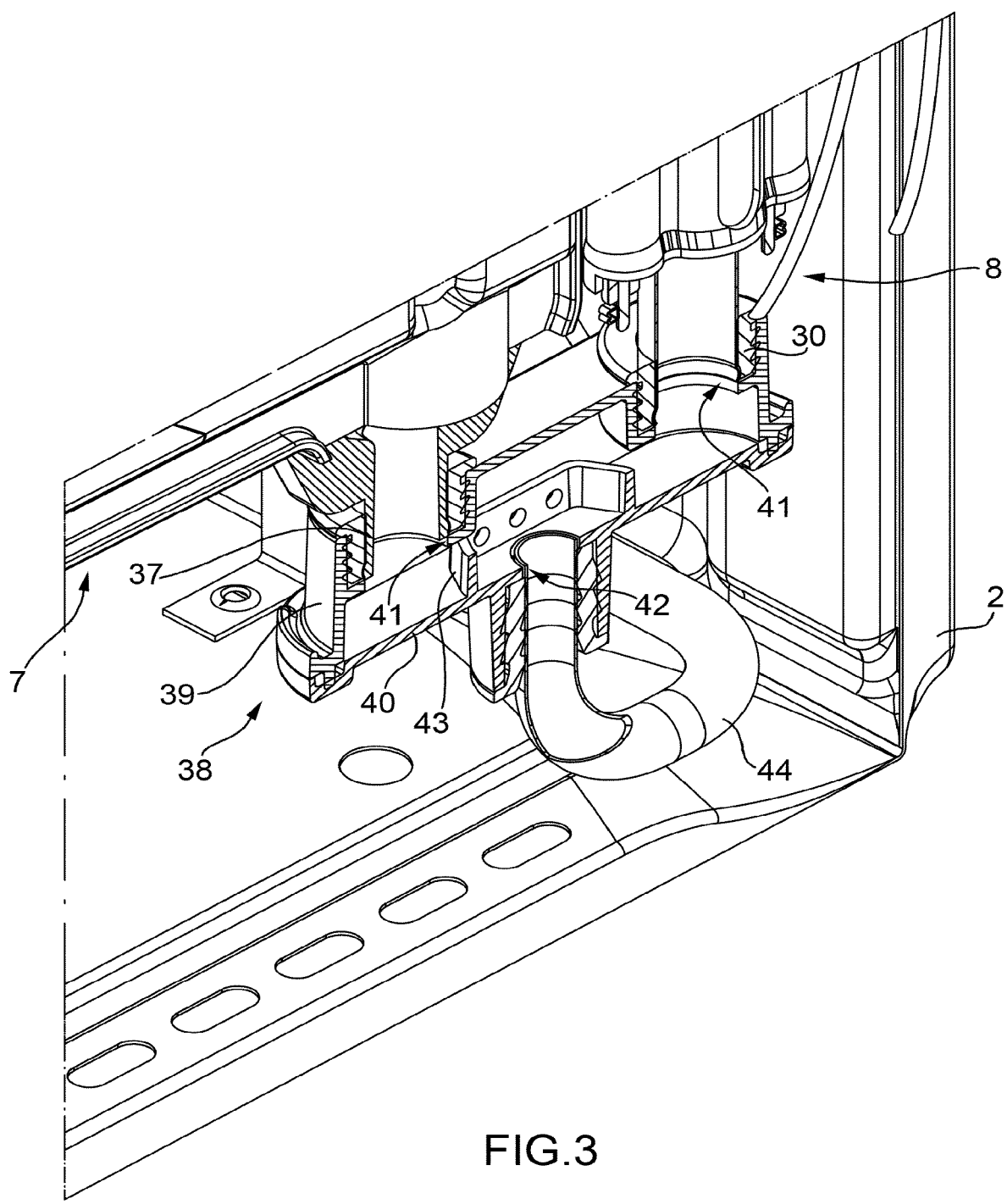
FIG. 3 shows a schematic view in perspective, with sectioned parts and parts removed for clarity, of a first detail of the oven of FIGS. 1 and 2.

With reference to FIGS. 3 and 4, the tank 7 is associated, furthermore, to a filtering device 38, which is mounted outside and beneath the shells 10a, 10b, and comprises an upper cup-shaped body 39, which is arranged with its concavity facing downwards, is hooked in a removable manner to the sixth sleeve 37 and to the lower end of the steam generator duct 30, and is closed by a lower lid 40, which is mounted in a removable manner on the body 39 itself.

The device 38 presents two ports 41, which are obtained through a bottom wall of the body 39 and are respectively coupled to the sixth sleeve 37, so as to admit water inside body 39, and to the steam generator duct 30 to supply the latter with water and is provided with an outlet 42, which is obtained through the lid 40. The outlet 42 is preferably interposed between the two ports 41 such that water passing from a port 41 to the other port 41 passes also over outlet 42.

The outlet 42 communicates with ports 41 through a perforated annular collar 43, which projects from the lid 40 into the body 39, and extends around the outlet 42, so as to prevent the limescale present in the water to reach the outlet 42 itself. The outlet 42, furthermore, is connected to a discharge duct 44, which extends between the device 38 and the wall 4, and allows the user to empty the tank 7.

In order to limit the heat exchange between the part of the tank 7 corresponding to the sleeve 16 and to the air trap 20 and the part of the tank 7 corresponding to the separation chamber 32 and in order to guarantee a correct operation of the sensor 22, the tank 7 is provided with a plurality of substantially vertical dividing baffles 45 (in particular four baffles 45), which are manufactured as one single piece together with the shell 10a, project inside the tank 7 perpendicular to the wall 34, and are arranged at a given distance from the edge 12.

The tank 7 is provided, furthermore, with a plurality of fixing brackets 46, which are manufactured as one single piece together with the shell 10a, so a to allow the tank 7 to be fitted to the frame 2. If preferred, said plurality of fixing brackets 46 may be formed as a single piece part on one of the two shells 10a, 10b and part on the other shell.

According to some variants that are not shown:

each sleeve 16 and/or 21 and/or 25 and/or 29 and/or 35 and/or 37 is manufactured as one single piece together with the shell 10b;

each sleeve 16 and/or 21 and/or 25 and/or 29 and/or 35 and/or 37 is obtained partly on the shell 10a and partly on the shell 10b; in this way an inlet/outlet opening formed by each of said sleeve is divided by the tank shell junction line 15.

each dividing baffle 45 is manufactured as one single piece together with the shell 10b; and each dividing baffle 45 is obtained partly on the shell 10a and partly on the shell 10b.

In use, the tank 7 and the duct 30 of the steam generator 8 are filled with water by the user through the filling duct 17.

Once the float 24 of the level sensor 22 has reached a position comprised between its lowered position and its raised position, or a position equal the latter, the food products to be baked have been inserted into the baking chamber 3, and a steam cooking mode of operation has been selected, the heating device 31 is activated, so as to cause the evaporation of a water amount present in the duct 30.

The mixture of water and steam generated by the heating of the water present in the duct 30 is fed through the sleeve 29 into the separation chamber 32, where the water bounces against the deflector 33, so as to be recirculated again in the tank 7, while the steam is fed, first of all, through the sleeve 35, then along the duct 36 of the feeding circuit 9, and, finally, into the baking chamber 3.

With reference to what has been described above, it should be pointed out that:

the excess water introduced by the user into the tank 7 through the duct 17 is discharged into the baking chamber 3 through the overflow duct 26;

at the end of one or more baking cycles, the tank 7 may be emptied by the user through the discharge duct 44;

the position and the shape of the filtering device 38 allow an easy maintenance and cleaning of the filtering device 38 itself by simply removing the lid 40 from the body 39;

the permanent connection of the shells 10a, 10b does not require the use of gaskets and allows the whole tank 7 to be inserted in the assembly line of the oven 1; and the fact that the separation chamber 32 is built-in in the tank 7 allows a reduction of the number of components used while assembling the oven 1 itself.

In addition, a tank 7 made according to the invention allows an easy installation of a water level sensor device 22 that may be inspected/removed by the tank 7 at any time. Furthermore, the provision of one or more sleeve 16, 21, 25, 29, 35, 37 formed partly on the shell 10a and partly on the shell 10b simplify the manufacture process of the tank 7 because reduces the number of runners to be installed in a mould when forming each of the two shells 10a, 10b. In fact, by forming one or more sleeve 16, 21, 25, 29, 35, 37 as disclosed above, the joining direction of the shells 10a, 10b of the tank 7 is the same as the demoulding direction of each of the shells in the injection-moulding machine, and it is perpendicular to the tank shells assembly plane.

The invention claimed is:

1. A steam feeding unit for feeding steam into a baking chamber of an oven, comprising:
    a water tank for storing water;
    a steam generator having an inlet and an outlet, said inlet being in fluid communication with said water tank for receiving water therefrom, said steam generator being configured to heat water therein to convert at least a portion of said water therein to steam;
    a separation chamber having only one inlet for moisture, said inlet being in fluid communication with said outlet of said steam generator for receiving a mixture of steam and water therefrom, said separation chamber being configured to separate steam and water from said mixture, a first outlet of said separation chamber being configured to discharge separated steam therefrom, and a second outlet of said separation chamber being in fluid communication with a location upstream of said inlet of said steam generator for recirculating separated water thereto; and
    a discharge duct fluidly connected to both the water reservoir and the steam generator, such that the discharge duct can drain both the water reservoir and the steam generator.

2. An oven comprising:
    a baking chamber; and
    the steam feeding unit according to claim 1, the first outlet of said separation chamber being in fluid communication with said baking chamber for delivering separated steam thereto.

3. The oven of claim 2, said steam generator comprising a generator duct and a heater configured to convert liquid water that enters said generator duct via said inlet of said steam generator to steam as said water proceeds through said generator duct toward said outlet.

4. The oven of claim 3, said inlet of said steam generator being arranged at a first end of said generator duct and said outlet of said steam generator being arranged at a second end of said generator duct.

5. The oven of claim 2, said water tank comprising an outlet in fluid communication with said inlet of said steam generator, said water tank and said steam generator being arranged such that water flows from said outlet of said water tank to said inlet of said steam generator via gravity.

6. The oven of claim 2, said separation chamber configured such that water received at said inlet of said separation chamber flows to said second outlet of said separation chamber via gravity.

7. The oven of claim 2, said first outlet of said separation chamber being arranged above said inlet of said separation chamber.

8. The oven of claim 2, said second outlet of said separation chamber configured such that water exits said separation chamber through said second outlet via gravity.

9. The oven of claim 8, said separation chamber arranged above a maximum water level in said water tank.

10. The oven of claim 2, said second outlet of said separation chamber being arranged above said location upstream of said inlet of said steam generator such that water that exits said second outlet of said separation chamber flows to said inlet of said steam generator via gravity.

11. The oven of claim 2, said inlet of said separation chamber being arranged above said outlet of said steam generator.

12. The oven of claim 2, further comprising a feeding duct having a first end connected to said first outlet of said separation chamber and a second end connected to said baking chamber.

13. A method of feeding steam into a baking chamber of an oven using the steam feeding unit according to claim 1, said method comprising the steps of:
    delivering water from the water tank to said steam generator,
    heating said water in said steam generator to produce a mixture of water and steam,
    delivering said mixture of water and steam to said separation chamber,
    within said separation chamber, separating said mixture into a water component and a steam component,
    recirculating said water component to said location upstream of said inlet of said steam generator,
    delivering said steam component to a feeding duct having a first end connected to said first outlet of said separation chamber and a second end connected to said baking chamber of said oven, and delivering said steam component from said feeding duct to said baking chamber.

14. The method of claim 13, wherein said step of delivering water from said water tank to said steam generator is carried out by gravity.

15. The method of claim 13, wherein said step of delivering said mixture of water and steam to said separation chamber occurs via upward flow.

16. The method of claim 13, wherein said steam component separated from said mixture in said separation chamber flows upward therein to said first outlet of said separation chamber en route to said baking chamber, and said water component separated from said mixture in said separation chamber flows downward therein by gravity to said second outlet of said separation chamber en route to said inlet of said steam generator.

17. The steam feeding unit of claim 1, said discharge duct being connected to a filtering device configured to filter water received therein from said water reservoir, the filtering device being connected in fluid communication between the water reservoir and the steam generator.

18. The steam feeding unit of claim 1, said steam generator comprising a heater configured to heat water therein.

* * * * *